United States Patent [19]

Riggs et al.

[11] 4,433,785
[45] Feb. 28, 1984

[54] LEANER GAUGE FOR NARROW NECK CONTAINERS

[75] Inventors: Darius O. Riggs, Ottawa Lake, Mich.; Thomas B. Sorbie, Toledo, Ohio

[73] Assignee: Owens-Illinois, Inc., Toledo, Ohio

[21] Appl. No.: 276,770

[22] Filed: Jun. 24, 1981

[51] Int. Cl.³ .............................................. B07C 5/00
[52] U.S. Cl. .................................. 209/531; 209/523; 209/538
[58] Field of Search .............. 209/522, 523, 530, 531, 209/538

[56] References Cited

U.S. PATENT DOCUMENTS

| | | | |
|---|---|---|---|
| 2,542,090 | 2/1951 | Lorenz | 209/531 |
| 3,289,834 | 12/1966 | Mathias | 209/530 |
| 3,313,409 | 4/1967 | Johnson | 209/532 X |
| 3,420,369 | 1/1969 | Sorbie | 209/531 |

Primary Examiner—Robert B. Reeves
Assistant Examiner—Edward M. Wacyra
Attorney, Agent, or Firm—Gerald T. Welch; Myron E. Click

[57] ABSTRACT

In the inspection of generally round glass containers where the containers are indexed into the gauging stations or positions by the movement of a starwheel mechanism, the containers are held in a generally upright attitude with their bottoms engaging a pair of spaced rollers extending through a slide plate at the gauging station. Each roller is biased in an upward direction against the container bottom. The containers are rotated, in station, by engagement of the sidewall thereof by a rotating wheel mounted on an axis that is somewhat out-of-vertical to aid in holding the container down against the rollers and slide plate. The gauging rollers each have their vertical movements drive the core of a separate differential transformer. The output of the transformers are amplified, alegebraically summed and fed to a discriminator. The tracking of the rollers is such that the output signals from the discriminator are a reflection of the relative positions of the rollers and the output is fed to a reject mechanism or indicator when a predetermined difference indicates that a "leaner" container is being gauged.

11 Claims, 8 Drawing Figures

LEANER GAUGE FOR NARROW NECK CONTAINERS

BACKGROUND OF THE INVENTION

In the manufacture of glass containers, occasionally containers will be produced where the bottoms of the containers will not be in a plane which is perpendicular to the central axis of the container. When this is true, the container will be what is termed a "leaner". In other words, as the container sits on its bottom, the vertical axis of the container will lean to one side or another, as the case may be. These types of containers create a problem when they are passed through filling lines and capping machines. Since the container is normally guided through these lines by sidewall engagement of the containers and they move along sliding on their bottoms, if the vertical axis of the container is not essentially vertical relative to the bottom of the container; therefore, "a leaner", the filling equipment, as it is lowered into the container mouth for filling, may jam against the finish or rim of the container or not enter the finish, resulting in an unfilled container.

With this in view, it is an object of this invention to provide apparatus which may be positioned at one station on an already-existing container inspection machine, such as that shown and described in U.S. Pat. No. 3,313,409, and to gauge containers for "lean".

The above-mentioned patent discloses apparatus for handling containers through a series of inspection positions whereat the containers are examined for various defects. The present invention may economically be included as a gauge at one of the stations that are presently found on this handling equipment.

In addition to the production of glass containers that may have their bases out of alignment with the axis of the container, where filling equipment may be impaired, the production of tumblers may also occur where the bottom is out of perpendicularity with the central axis. While this fault may not impair the use of the tumbler, it is certainly a defect to be avoided from a marketing point of view. Tableware that is not straight sided or does not have a horizontal base relative to its vertical axis would provide an odd appearance.

SUMMARY OF THE INVENTION

Method and apparatus for measuring the relationship of the bottom of the container to its central axis wherein the containers are slid on their bottom into gauging position, rotated by engagement of the sidewall with a wheel about their vertical axes, and during this rotation, diametrically opposed portions of the bottom of the container are sensed with means connected to the sensing devices for indicating when the bottom is non-normal to the rotational axis a predetermined amount. The containers found to be out of specification may be rejected and identified.

DETAILED DESCRIPTION OF THE DRAWINGS

Figure 1:
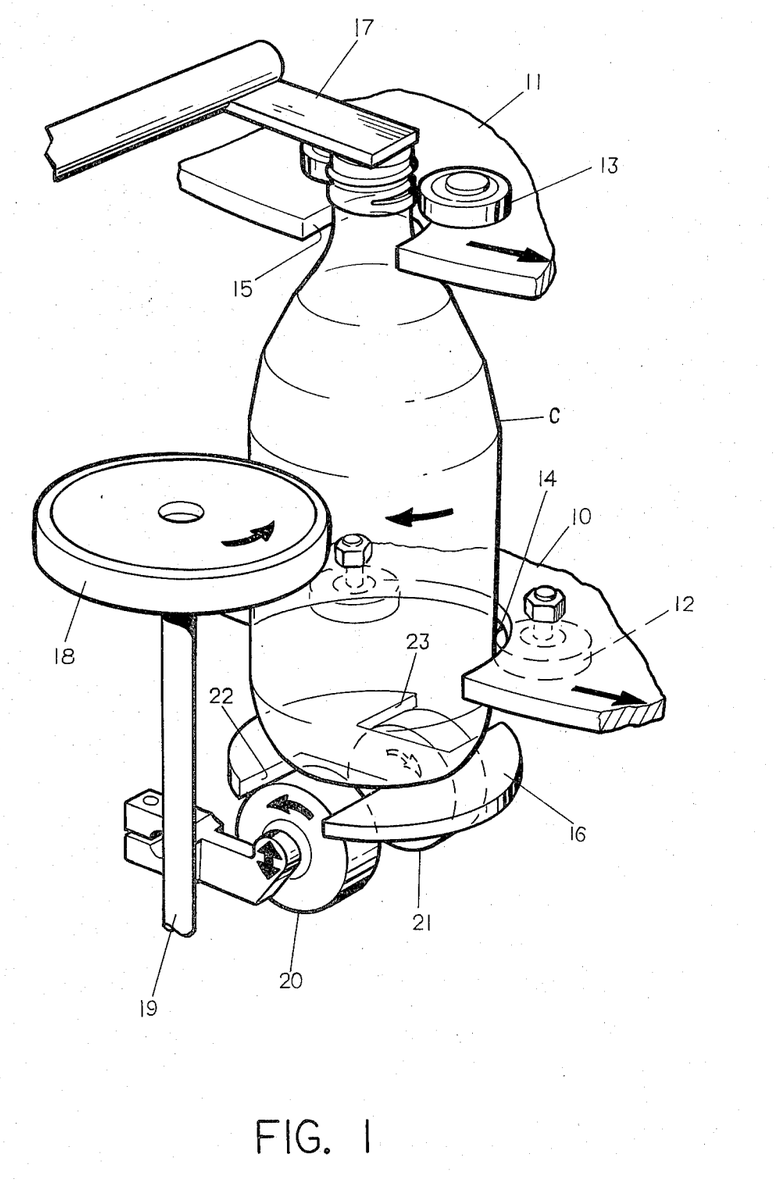
FIG. 1 is a schematic, perspective view of the leaner gauge concept of the invention with a container in gauging position.
Figure 2:
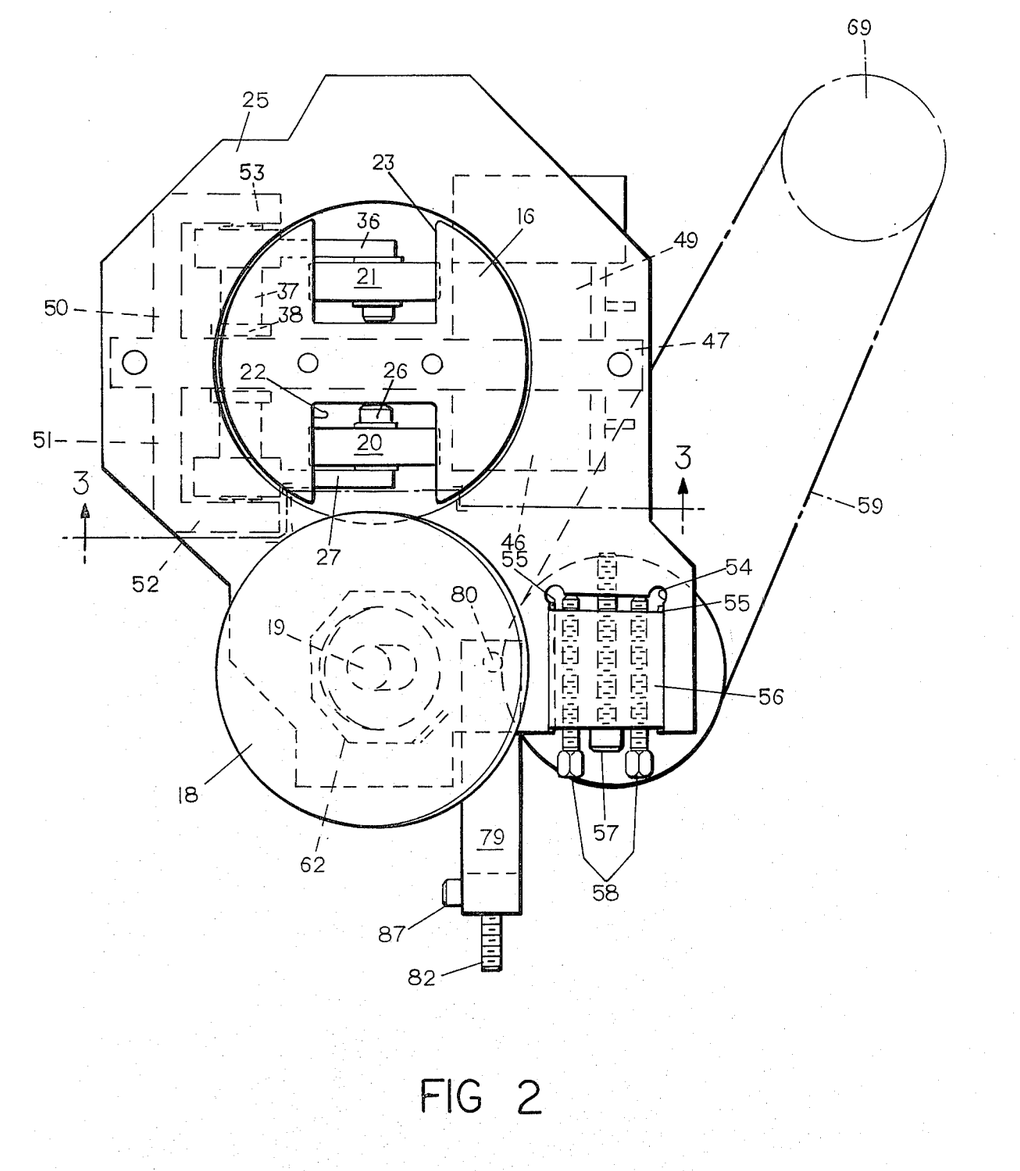
FIG. 2 is a top plan view of the detailed apparatus of the invention.

With particular reference to FIGS. 1 and 2, one should keep in mind that FIG. 1 is a schematic view showing only the moving mechanisms without the supporting structure thereof. In considering the showing in FIG. 1, reference should be had to applicants' prior U.S. Pat. No. 3,599,780, wherein a bottle handling system is disclosed for moving glassware to and through a plurality of inspection stations. The handling equipment involves having the form of vertically spaced-apart, horizontal starwheels which engage the side of the bottle and upon indexing of the starwheels, the bottles are moved in a series of steps from an incoming conveyor to an outgoing conveyor. In this environment, the present invention relates to apparatus for measuring the lean of a bottle at one of the single stations at which inspection takes place.

As shown in FIG. 1, the bottle indexing mechanism comprises a lower starwheel 10 and upper starwheel 11, of which only fragments are shown. Starwheel 10 supports pairs of rollers 12 with their periphery extending into the area formed by a cutout 14 in the lower starwheel 10 and rollers 13 serving to support the neck of a container "C" positioned within a cutout 15 in the upper starwheel 11. The depicted container is known in the art as a "narrow-neck container", and is most widely used for soft drinks and beer.

The starwheels 10 and 11 are indexed in the direction of the arrows shown thereon in FIG. 1 to bring the container "C" into the position depicted in FIG. 1. As the container is brought into the position shown in FIG. 1, the bottom of the container will slide over a plate 16. The bottle is loosely held down during this movement, into the position where it is generally concentric with respect to the plate 16, by a plastic finger 17 mounted to the end of a support post. When the container comes into the station shown in FIG. 1, it will be engaged by a side-engaging roller 18 mounted on a drive shaft 19. Rotation of the roller 18, in the direction of the arrow shown thereon, will rotate the container generally about its vertical axis in the direction of the arrow shown on the side of the container. As the container rotates, the lower portion of the container will be in engagement with a pair of gauging rollers 20 and 21. These rollers have their upper peripheral surfaces extending through diametrically opposed openings 22 and 23 in the plate 16. As the container is rotated about its vertical axis, the bottom of the container, in engagement with the engaging rollers 20 and 21, will move the rollers 20 and 21 up or down in response to the relationship of the plane of the bottom of the container relative to the general vertical axis of the container. The finish or upper portion of the container, of course, during rotation, is in engagement with the rollers 13, while the sidewall or body of the container is rotated in engagement with the rollers 12. It is assumed that upon set-up of the system for any particular size container, that the rollers 12 and 13 will position the container with its central axis vertical. The further apart the rollers 12 and 13 can be spaced, the more accurate the gauging will be.

As will be seen later in the more detailed description of the apparatus, the drive shaft 19 is at an angle to the vertical such that the roller 18 will now only serve to rotate the container "C" about its axis, but also will hold the container "C" down against the plate 16 and the gauging rollers 20 and 21.

Figure 3:
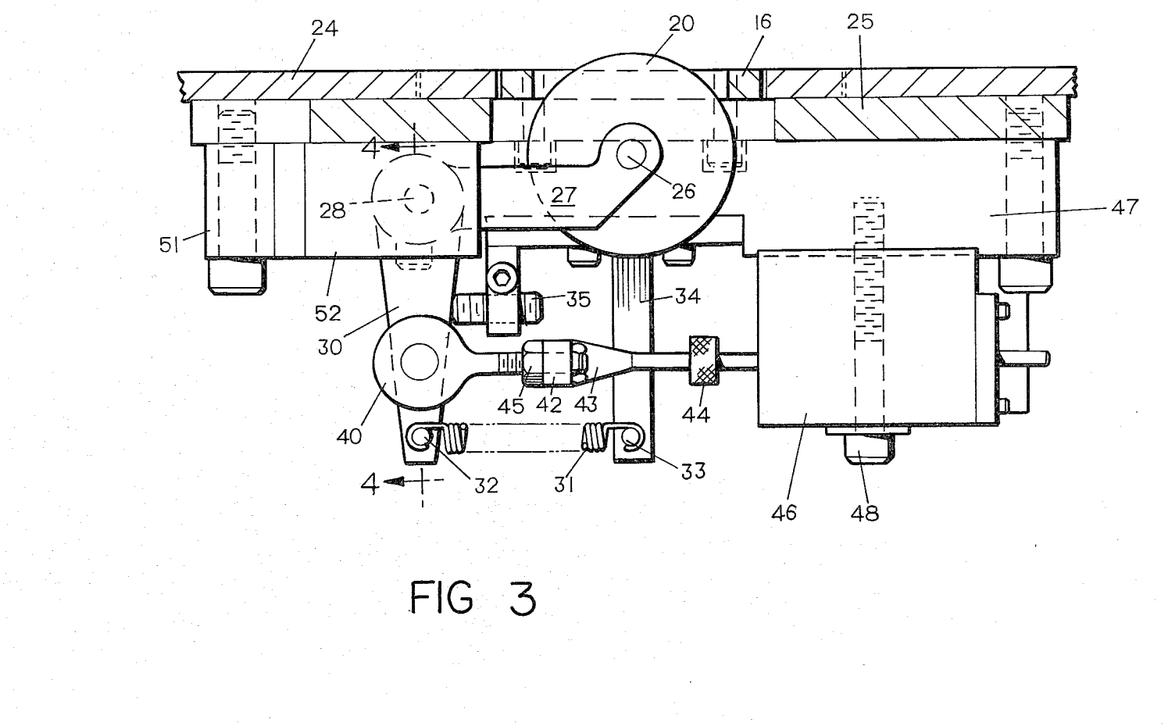
FIG. 3 is a cross-sectional view taken at line 3—3 of FIG. 2.

The plate 16, as best seen in FIGS. 2 and 3, is generally circular and is positioned within a central, circular opening formed in a slide plate 24 (See FIG. 3). The slide plate 24 extends about the inspection machine, in general, and serves as the surface upon which the ware is slid from station to station. The view in FIG. 2 does not have the slide plate shown but shows a support plate 25 which also has a circular opening therein above which the plate 16 is positioned. The support plate 25 mounts under the slide plate 24. Plate 25 serves as the mounting member for the bottle drive mechanism at the inspection station and the supporting mechanism for the gauging rollers. It should be understood that plate 25 is generally a horizontal plate that is mounted beneath the plate that supports the containers as they are moved through five inspection stations on the existing handling mechansim. An example of a complete inspection device is shown in U.S. Pat. No. 3,313,409.

Figure 4:
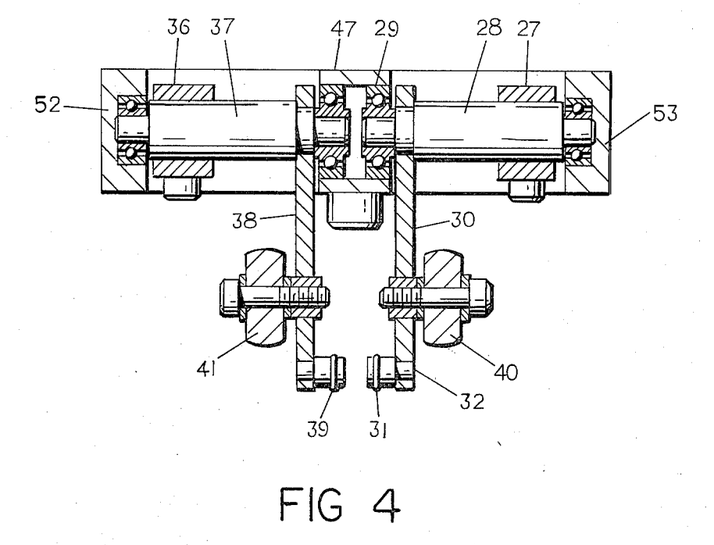
FIG. 4 is a cross-sectional view taken at line 4—4 of FIG. 3.

With particular reference to FIGS. 2, 3 and 4, it can be seen that roller 20 is shown mounted to a horizontal axle 26. The axle 26 is carried by an arm 27 which is fixed at its opposite end to a spindle 28. The spindle 28 is supported for rotation about its horizontal axis by bearings 29. The spindle 28 also has a downwardly extending crank arm 30. The crank arm 30 is biased in a counter-clockwise direction, as viewed in FIG. 3, by a spring 31 connected to a post 32 on the lower end of the arm 30 and to a post 33 on a fixed member 34. The arm 30, when not in engagement with the bottom of a bottle, will be held against rotation by an adjustable stop screw 35. Thus, the upper surface of the gauging roller 20 is limited in its upward movement, which permits the containers to be moved into the station over the rollers without undue interference during the sliding motion of the containers over the plate 24 and into position over the plate 16. The roller 21 is similarly supported by an arm 36 which also is connected to a spindle 37 similar to the spindle 28. Likewise, the spindle 37 has a crank arm 38 extending downwardly therefrom and the arm 38 is biased by a spring 39 in the same manner as the spring 31 biases the arm 30.

Intermediate the length of the crank arms 30 and 38 are eyebolts 40 and 41, with the eye of the bolts being pivotally connected to the respective arms 30 and 38. The threaded end of the eyebolt 40, extending to the right as viewed in FIG. 3, is threaded in end 42 of an elongated member 43. The member 43 carries a thumb wheel 44 which may be used to rotate the member 43 to position its end 42 relative to the length of the threaded end of the eyebolt 40. A retaining nut 45 on the threaded end of the eyebolt 40 may be tightened against the end 42 to lock member 43 in whatever adjusted position is desired. The member 43 at its opposite end extends into a differential transformer housing 46. The armature of the differential transformer container within the housing 46 will be connected to the member 43. The differential transformer housing 46 is fastened to a mounting block 47 by a bolt 48. It should be understood that the roller 21 and its eyebolt 41 is also connected to a differential transformer 49 in essentially the same manner as the connections to the transformer 46.

As can be seen when viewing FIGS. 2, 3 and 4, the block 47 actually is composed of a generally horizontally extending member that passes between the two rollers 20 and 21 and, intermediate its one end, serves as the mounting for the bearings 29. Additionally, a pair of arms 50 and 51 extend outwardly therefrom at its end and have inwardly turned ends 52 and 53 which serve as the outer supports for the bearings of the spindles 37 and 28. The configuration of this block, in plan view, is shown in dotted line in FIG. 2.

With specific reference to FIGS. 2 and 5, the mechanism for driving the roller 18 will be described in detail. In the lower right hand portion of plate 25, as shown in the plan view in FIG. 2, is a rectangular cut-out 54 that extends to the front of the plate. This opening 54, along each side thereof, has elongated, inwardly-extending tongues 55. These tongues fit within matching grooves formed in the edge of a generally square mounting plate 56. The mounting plate 56 is horizontally slidable relative to the cut-out 54 and its adjustment may be made by loosening a threaded bolt 57 which extends horizontally through the length of the plate 56 and is threaded into the edge of the plate 25. After loosening the bolt 57, a pair of threaded takeup screws 58 in the plate 56 may then be tightened to assure that pate 56 will be fixed in its adjusted position. Obviously, in this manner, the plate 56 may be moved into or out of the cutout 54 as desired. This adjustment is, as will be later described, for the purpose of adjusting the tension in a belt 59.

Figure 6:
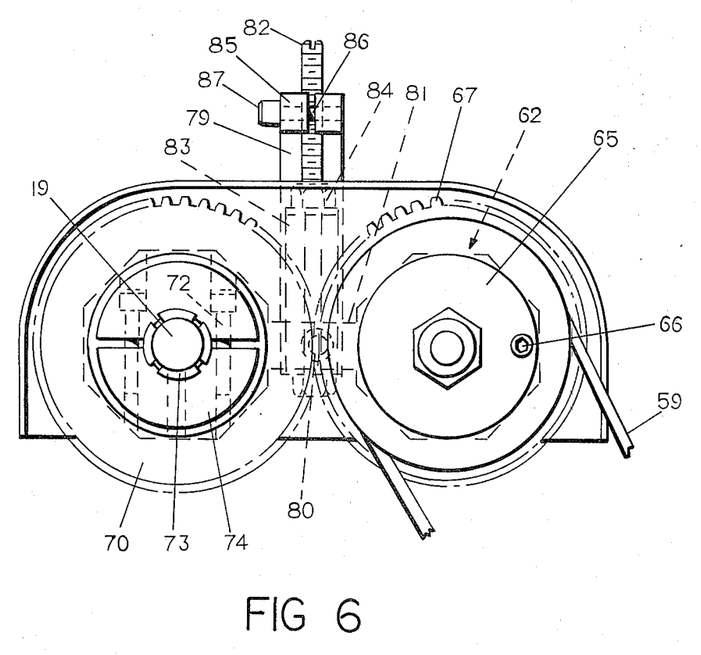
FIG. 6 is a bottom view of the bottle rotating mechanism of FIG. 5.

The plate 56 has fixed to its undersurface a downwardly extending two-tiered or dual diameter shaft 60 with a threaded lower end. The upper or larger diameter portion of the shaft 60 supports a pair of bearings 61 within a generally figure-eight shaped casting 62. The shape of the casting is perhaps best seen in dotted line in FIG. 6. The lower and smaller diameter portion of the shaft 60 supports bearings 63 whose outer races are carried in a mounting sleeve 64. A drive pulley 65, about which the belt 59 is positioned, is fastened by a bolt 66 to the mounting sleeve 64. A driven pinion 67 is mounted to the opposite side of the mounting sleeve 65 and held thereto with a bolt 68. Thus, it can be seen that when the belt 59 is driven, it will in turn drive the pulley 65 and the pinion 67. It should be pointed out that the belt 59 is driven by a drive pulley 69, schematically shown in FIG. 2. This pulley 69 is present on the existing gauging machine, to which the present invention is adapted and may be rotated at a fairly high speed. A threaded nut on the end of shaft 60 maintains the bearings 63 in place.

The pinion gear 67 meshes with a second pinion gear 70 which is fixed to a mounting sleeve 71 by a bolt 72. The mounting sleeve 71 is annular and has an elongated, shaft-embracing sleeve 73 extending therethrough. Beneath the mounting sleeve 71 is a clamp sleeve 74 and, as is shown in dotted line in FIG. 5, the clamp sleeve 74 has an upstanding ear 75 that fits within a corresponding recess in the mounting sleeve 71. The clamp sleeve 74 also surrounds the lower portion of the shaft-embracing sleeve 73 such that tightening of bolts 76 of the clamp sleeve 74 will result in the snug engagement of the sleeve with the shaft 19. Obviously, loosening of the bolts 76 will permit vertical adustment of the shaft 19 relative to the shaft-embracing sleeve 73. However, once the bolts are tightened, the clamp sleeve will assure that the shaft 19 and the pinion gear 70 will be in rigid driving connection. The sleeve 73 extends above the pinion 70 and is supported by bearings 77 within a vertical opening 78 of the casting 62.

Figure 5:
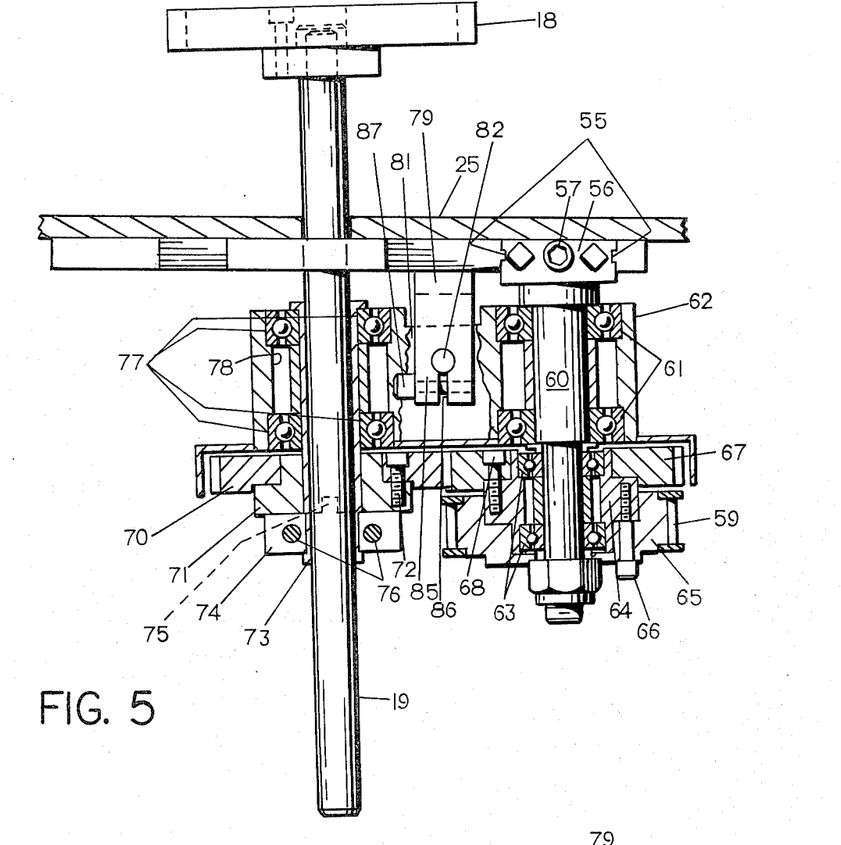
FIG. 5 is a side elevational view of the apparatus of FIG. 2, with the bearing housings shown in cross-section.

It should be noted that the shaft 19, as viewed in FIG. 5, is not vertical with respect to the plane of the plate 25. This angle is purposefully built in and close scrutiny of the mounting plate 56 will reveal that, as viewed in FIG. 5, the right side of the plate is not as thick as the left side of the plate. This then makes the shaft 60, which is normal to the bottom surface of the plate 56, also extend at a non-vertical angle with respect to the surface of the plate 25. In this manner, the casting 62 and the mechanism which it supports is positioned at an angle with respect to the vertical.

Figure 7:
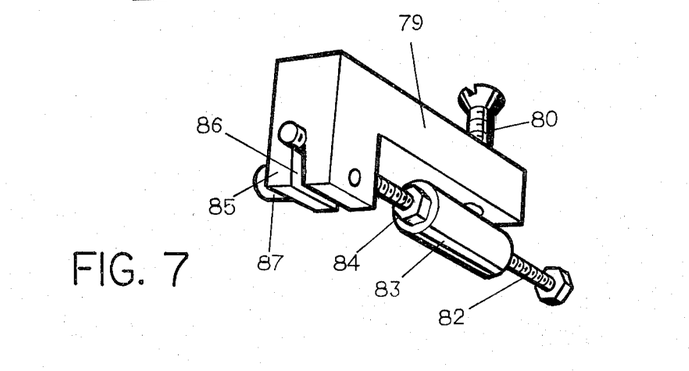
FIG. 7 is a perspective view of an adjustment feature for accommodating the invention to different sizes of containers.

As pointed out previously, adjustment of the plate 56 will change the tension or adjust the tension in the drive belt 59. A further adjustment of the bottle drive mechanism is provided in order to adapt the side-engaging roller 18 to driving containers of different diameters. Once set up, the mechanism will obviously be operating to rotate containers of the one size that are being produced at that time. However, the device is capable of being adjusted for other size ware. This adjustment is shown in detail in FIGS. 6 and 7 and comprises a horizontal bracket 79 which is bolted to the underside of the plate 25 by bolt 80.

As previously stated, the casting 62 is generally in the shape of a figure-eight, as viewed from above and has a web portion 81 connecting the two circular portions. This web 81 has a horizontal opening extending therethrough through which a bolt 82 extends.

The bolt 82 has a snubber sleeve 83 thereon backed by a nut 84. The nut 84 is threaded up the bolt 82 and serves to clamp the rubber spring 83 into snug engagement with the web portion 81 of the casting 62. A downwardly extending portion 85 of the bracket 79 is provided with a generally horizontal opening through which the end of the bolt 82 extends. The portion 85 is split at 86 up to the opening formed therein. A clamping bolt 87 extends through threaded openings in the portion 85 and spans the split 86 therein so that upon tightening of the bolt 87, the bolt 82 is clamped within the bracket 79.

With reference to FIG. 2, the adjustable position of the angle of the bracket 79 is illustrated in dotted or phantom line, it being understood that by loosening of the bolt 80, the bracket 79 may be moved to the right, the effect of which will be to swing the roller 18 and its shaft 19 in a generally counterclockwise direction moving the periphery of the roller 18 away from the center of the plate 16. This will take place, since the casting 62 is free to rotate about the shaft 60 while still maintaining engagement between the gears 67 and 70, the effect of which will be to move the roller 18 away from or, if adjusted in the other direction, to move the roller toward the center of the plate 16 thus accommodating the mechanism for ware of different diameters.

Figure 8:
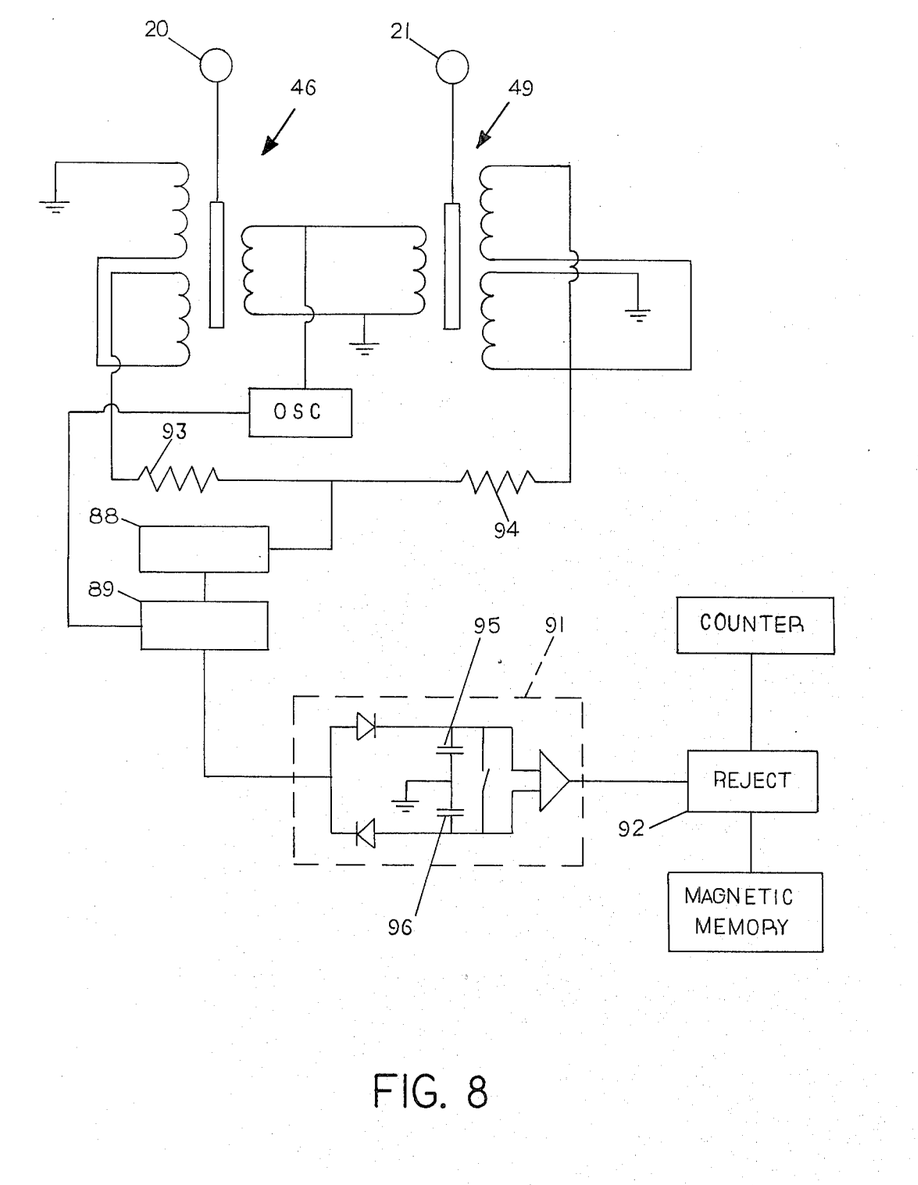
FIG. 8 is a block diagram of the electronic circuitry used for analyzing the signals from the differential transformers.

Turning now to the schematic circuit diagram of FIG. 8, it can be seen that the transformers have their secondary windings connected in parallel bucking output through summing resistors 93 and 94. The resultant signal from the junction of the resistors is fed to a signal amplifier 88, then to a demodulator 89. The output from the demodulator is fed to a detector circuit 91 which includes a positive peak voltage storage capacitor 95 and a negative peak voltage storage capacitor 96. It will be readily appreciated that the cores or armatures of the transformers 46 and 49 will initially be positioned in relation to the rollers 20 and 21 so that the cores are within the ranges of the differential transformers when a container is placed in the measuring apparatus. This position is not critical but whatever it is, at the inception of the gauging period, identical voltages will be stored on the pair of storage capacitors 95 and 96, corresponding to the resultant signal at the junction of the summing resistances at that instant. If the roller positions do not appreciably change, one relative to the other, during gauging, there will be little changes in the resultant electrical signal from the parallel bucking outputs of the differential transformers, the electrical charges on the pair of electrical storage capacitors will have little change, and the bottle will be judged good by the gauge. If the plane of the bottom of the bottle with reference to the bottle axis does change appreciably, there will be a commensurate change in the resultant electrical signal from the parallel bucking outputs of the differential transformers, and a corresponding displacement of the charges stored on the electrical capacitors. Bottles are rejected as leaners when the displacement in the electrical charges on the storage capacitors exceed predetermined limits. Details and functions of these well known electronic components are fully and completely disclosed in U.S. Pat. No. 3,273,710 issued Sept. 20, 1966, one applicant being a co-inventor.

As can be seen when viewing FIG. 8, the output of the detector 91 is fed to a reject relay 92. The reject relay may operate a reject solenoid in the usual manner, or may actuate a magnetic memory system and also can operate a counter as schematically shown in FIG. 8.

It can readily be seen that the sum of the outputs of these two transformers is being utilized to produce a signal for operating the detector channel of the electronic circuitry.

It has been applicants' experience that by providing a pair of rollers or contact members and individually sensing the position of the rollers, and in turn summing the resultant signals, that a more accurate signal will be received than by providing the output from a single differential transformer.

When a leaner is being measured, the output signal received from the two transformers connected in parallel bucking will change since the mean level of the cores will change as the rollers transverse the contours of the bottom of the container Thus, by the use of two differential transformers having their output windings connected in parallel bucking, with the outputs of the two transformers being algebraically added, the voltage signal which is fed to the discriminator will be a voltage proportional to the average or mean level of the container bottom. This average signal and the ability to provide such a signal is an important aspect of the invention since it assures that the rejection of "leaners" will be accomplished without erroneus indications. The plane of the bottom of the container will be indicated as being non-normal to the axis of rotation of the container as the output of the transformers fluctuates at the same frequency as the rotational velocity. Movement of transformer cores caused by upward or downward shifting of the bottle are cancelled out. Leaner caused movements are not cancelled but are additive.

Electrical signals resulting from simultaneous, equal increments of movement of the rollers in the same direction cancel each other. Thus a bottle can be displaced vertically, within the range of the differential transformers, and not be rejected. Leaners cause vertical movements of the rollers in opposed directions and the resultant signals are additive and a sufficient signal causes a reject.

The initial position of the rollers is unconsequential as long as they are within the range of the transformers.

During rotation the bottles must be held on axis although not necessarily normal to the slide plate.

While the foregoing description deals with transformers connected in parallel bucking relationship, it should be apparent they could be connected in series bucking relationship with one demodulator.

Furthermore, each transformer could be connected to separate demodulators with the separate outputs added before detection. The summing could be through summing resistors with oppositely phased transformers or alternatively could be through a comparator.

We claim:

1. Method of measuring the plane of the bottom of a glass container relative to its vertical axis comprising:
    sliding a container sideways over a slide plate into a gauging position;
    holding the container in light contact with the slide plate during movement thereof;
    rotating the container about its vertical axis;
    sensing the relative height of the bottom of the bottle at diametrically opposed points as it is rotated; and
    rejecting containers whose bottoms are non-normal to their vertical axis a predetermined amount.

2. The method of claim 1 wherein said rotation of said container is by engaging the sidewall of the container at the gauging position with a rotating wheel.

3. Apparatus for measuring the plane of the bottom of a generally cylindrical glass container, comprising:
    a generally horizontal slide plate at a gauging position;
    means for laterally moving containers into gauging position, said slide plate having a pair of spaced openings therein;
    means engaging the side of said containers when in gauging position for rotating said containers with the bottom of the container contacting said slide plate;
    means engaging the bottom of said container through said openings;
    means sensing the position of said bottom-engaging means;
    means connected to said sensing means for indicating the slant of the container bottom relative to the containers vertical axis; and
    means for rejecting containers whose bottoms are out of normal a predetermined amount.

4. The apparatus of claim 3 wherein said sensing means comprises a pair of rollers whose periphery extends through said openings in said slide plate.

5. The apparatus of claim 4 further comprising means connected to said rollers for biasing said rollers in an upward direction.

6. The apparatus of claim 5 further comprising differential transformer means connected to each roller and means connected to said transformers for detecting relative movement of said transformer's cores a predetermined amount.

7. The apparatus of claim 6 wherein said means connected to said transformers comprises an electronic circuit including a pair of capacitors having equal charges when the transformer's cores remain at the same relative position and means for indicating when the charge on said capacitors becomes unbalanced a predetermined amount.

8. The apparatus of claim 7 wherein said electronic circuit includes a demodulator for removing the primary frequency from the differential transformers after the signals are combined.

9. The apparatus of claim 7 wherein said electronic circuit includes two demodulators for removing the primary frequency from the differential transformers before the signals are combined.

10. The apparatus of claim 3 wherein said means for rotating the containers comprises a wheel in engagement with the side of said bottle and means for rotating said wheel.

11. The apparatus of claim 10 further comprising means mounting said wheel on an axle that is slightly tilted with respect to the vertical axis of the container, whereby rotation of the wheel will rotate the container and hold the bottom of the container against said slide plate.

* * * * *